United States Patent [19]

Clerc et al.

[11] Patent Number: 4,786,147

[45] Date of Patent: Nov. 22, 1988

[54] NEMATIC LIQUID CELL WEAKLY DOPED BY A CHIRAL SOLUTE AND OF THE TYPE HAVING ELECTRICALLY CONTROLLED BIREFRINGENCE

[75] Inventors: Jean-Frédéric Clerc, Reylan; Laurence Rabas, Saint-Macliu-D' Héres, both of France

[73] Assignee: Commissariat A L'Energie Atomique, Paris, France

[21] Appl. No.: 165,376

[22] Filed: Feb. 29, 1988

Related U.S. Application Data

[63] Continuation of Ser. No. 756,059, Jul. 17, 1985.

[30] Foreign Application Priority Data

Jul. 26, 1984 [FR] France ................................ 84 11896

[51] Int. Cl.[4] .................................................. G02F 1/137
[52] U.S. Cl. ...................................... 350/337; 350/340; 350/349; 350/350 R
[58] Field of Search ................... 350/346, 347 E, 349, 350/352, 337, 338, 350 R, 340

[56] References Cited

U.S. PATENT DOCUMENTS

| | | | |
|---|---|---|---|
| 3,690,053 | 9/1972 | Kahn | 350/347 E |
| 3,814,501 | 6/1974 | Schindcer | 350/338 |
| 3,914,022 | 10/1975 | Kashnow | 350/340 |
| 4,019,807 | 4/1977 | Boswell et al. | |
| 4,097,130 | 6/1978 | Cole | 350/349 |
| 4,231,068 | 10/1980 | Hunt | 350/347 E X |
| 4,402,999 | 9/1983 | Tatsumichi et al. | 350/340 X |
| 4,490,015 | 12/1984 | Kawarada et al. | 350/340 |
| 4,492,432 | 1/1985 | Kuafman | 350/338 |
| 4,497,543 | 2/1985 | Aoki et al. | 350/349 |
| 4,506,956 | 3/1985 | Dir | 350/349 |
| 4,596,446 | 1/1986 | Waters | 350/346 |
| 4,601,547 | 7/1986 | Shingu | 350/349 |

FOREIGN PATENT DOCUMENTS

| | | | |
|---|---|---|---|
| 2025648 | 1/1980 | United Kingdom | 350/340 |
| 2033602 | 5/1980 | United Kingdom | |

OTHER PUBLICATIONS

Kwon et al., "Improved Liquid Crystal Device Response Time" Applied Optics, vol. 18, No. 11, Jun. 1, 1979.

Gharadjedaghi et al., "A Nove Type of Inverted Dichroic Display Employing a Positive Dielectric Anistropy Liquid Crystal" IEEE Trans. on Elec. Dev., vol. ED-27, No. 11, Nov. 1980, pp. 2063–2069.

Journal of Applied Physics, vol. 53, No. 12, Dec. 1982, pp. 8599–8606, New York, U.S.; W. R. Heffner et al.: "Switching Characteristics of a Bistable Cholesteric Twist Cell", p. 8599, colonne de gauche, paragrahe A, lignes 1–9 et p. 8600.

*Primary Examiner*—Stanley D. Miller
*Assistant Examiner*—David Lewis
*Attorney, Agent, or Firm*—Pearne, Gordon, McCoy & Granger

[57] ABSTRACT

The nematic liquid crystal cell weakly doped by a chiral solute and of the electrically controlled birefringence type. Doping is such that the resulting cholesteric liquid crystal twist exceeds approximately twice the thickness of the liquid crystal coating and is less than approximately 8 times said thickness. Moreover, one of the sides of the cell is to be exposed to incident light and at least on said side, the cell comprises an advantageously linear polarizer. Application to the production of displays for moving images or pictures.

3 Claims, 2 Drawing Sheets

NEMATIC LIQUID CELL WEAKLY DOPED BY A CHIRAL SOLUTE AND OF THE TYPE HAVING ELECTRICALLY CONTROLLED BIREFRINGENCE

This is a continuation, of application Ser. No. 756,059, filed on July 17, 1985.

BACKGROUND OF THE INVENTION

The present invention relates to a nematic liquid crystal cell weakly doped by a chiral solute and of the type having electrically controlled birefringence. It particularly applies to the production of means for the display of fixed or moving images or pictures.

Nematic liquid crystal cells are known, which utilize the electrically controlled birefringence effect. Such cells suffer from the disadvantage of requiring expensive circular polarizes to enable them to function correctly.

Liquid crystal cells are also known, which have a nematic liquid crystal coating to which a dichroic dye is added and which are highly doped by a chiral solute, in such a way that the resulting cholesteric liquid crystal twist is roughly the same as the thickness of the liquid crystal coating. In order to function, such cells use the selective absorption of the dichroic dye in unpolarized natural light and the "white" and "black" states of said cells respectively corresponding to the very different tilts of the molecules in said cells. In the centre thereof, the tilt is approximately zero degrees for the white state and approximately 70 to 90 degrees for the black state.

SUMMARY OF THE INVENTION

The present invention is directed at obviating the aforementioned disadvantage and, in a special realization, to also make it possible to obtain display means, whose multiplexing ratio or level and consequently the number of lines exceed that of known displays using the electrically controlled birefringence effect (for which the number of lines hardly exceeds 250).

The present invention more specifically relates to a liquid crystal cell comprising a system having a liquid crystal coating and two electrodes on either side of the coating and whereof at least one is transparent, wherein the liquid crystal is a nematic liquid crystal having a negative dielectric anisotropy and weakly doped by a chiral solute, in such a way that the resulting cholesteric liquid crystal twist exceeds approximately twice the thickness of the coating and is less than approximately 8 times said thickness, wherein one of the sides of said system is to be exposed to an incident light and wherein the cell is of the electrically controlled birefringence type and comprises, at least on said side, an incident light polarization means.

The present invention consequently makes it possible to use, as desired, for the polarization of the light either one or more circular polarizers, or one or more linear polarizers, the latter being much less costly than the former. rodes are transparent and the cell comprises two crossed linear polarizers on either side of the electrodes.

One of the polarizers can be disposed in such a way that its maximum absorption takes place parallel to the alignment direction of the liquid crystal molecules located in the centre of the coating, respectively in the absence of a voltage between the electrodes and in the presence of a voltage between the same exceeding the threshold voltage of the cell.

According to a special embodiment, the polarization means is a linear polarizer and one of the electrodes is optically reflective and is located opposite to said polarizer with respect to the liquid crystal coating.

The polarizer can be positioned in such a way that its maximum absorption takes place parallel to the alignment directions of the liquid crystal molecules located in the centre of the coating, respectively in the absence of a voltage between the electrodes and in the presence of a voltage between them and which exceeds the threshold voltage of the cell.

Finally, according to a special embodiment, the nematic liquid crystal is chosen in such a way that its fanning $K_{11}$, twisting $K_{22}$ and bending $K_{33}$ elastics constants prove the following relation:

$$7K_{33} > 6K_{22} + 3K_{11}$$

As will be shown hereinafter, this leads to an improvement in the selectivity on electric addressing and consequently the multiplexing ratio compared with a pure nematic.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
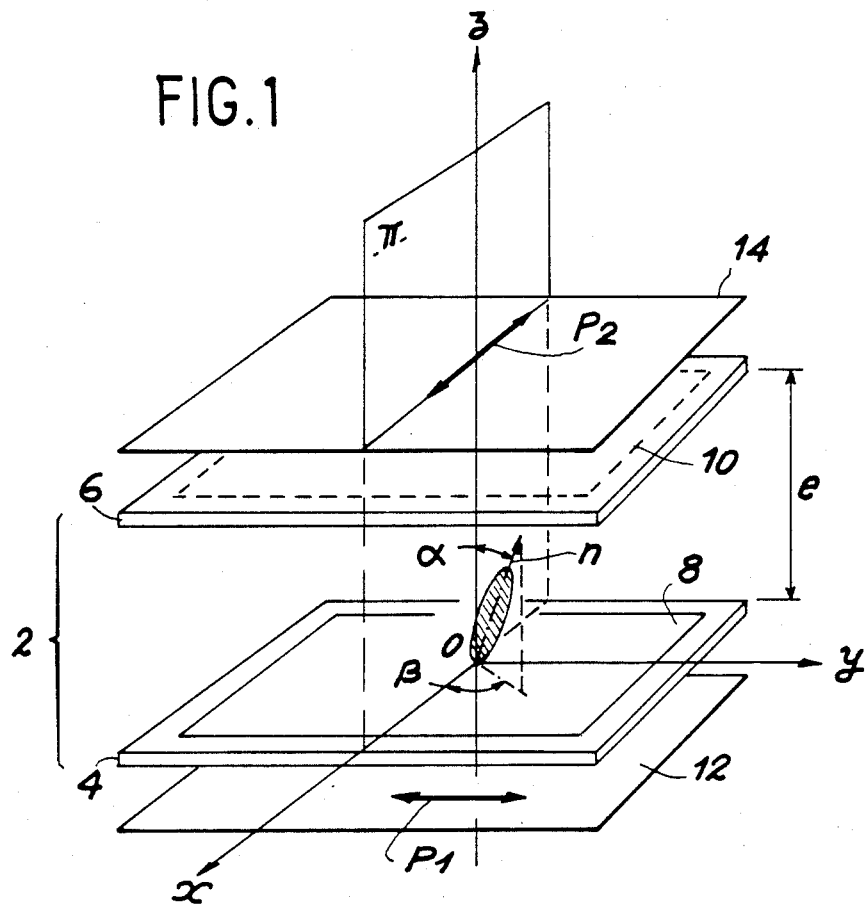
FIG. 1 a diagrammatic exploded view of a doped nematic liquid crystal cell using the electrically controlled birefringency effect according to the invention.

FIG. 1 diagrammatically shows in exploded view form, a liquid crystal cell according to the invention, which comprises liquid crystal coating 2 of thickness e between a lower plate 4 and an upper plate 6, which are parallel and transparent and are e.g. made from glass. Electrodes 8 and 9 are respectively placed on the faces of plates 4, 6, which directly face one another.

The liquid crystal is of the nematic type and is weakly doped by a chiral solute, in such a way that the resulting cholesteric liquid crystal twist $P_O$ proves the following double inequality :

$$2e \leq P_O \leq 8e \tag{1}$$

Moreover, the cell is of the electrically controlled birefringence type, i.e. in the absence of a voltage between the electrodes, the liquid crystal molecules are substantially perpendicular to plates 4 and 6 and are consequently parallel to an axis Oz perpendicular to said plates and oriented from lower plate 4 to upper plate 6, point 0 being chosen on the lower plate in such a way that said point corresponds to a zero liquid crystal thickness.

When a voltage exceeding a threshold voltage which will be considered hereinafter is applied between the electrodes, the axes n of the liquid crystal molecules tilt with respect to said axis Oz and form with the latter angles $\alpha$, whose value is dependent on the depth at which the molecules are located in the liquid crystal coating. The molecules located at e/2 on axis Oz tilt by an angle $\alpha_M$. Thus, it is possible to define a direct corner cube Oxyz, whose axis Ox is parallel to the plane defined by axis Oz and by the direction taken by the molecules located at depth e/2 and which have tilted under the effect of a voltage exceeding the threshold voltage.

Under the effect of this voltage, the projections on plane Oxy of the axes n of the molecules of the liquid crystal coating also form with axis Ox angle $\beta$ dependent on the depth at which the molecules are located in the liquid crystal coating.

Consideration will now be given to the question of improving the multiplexing ratio or level according to the invention. It is the tilt angle of the molecules under the effect of a voltage applied between the electrodes which determines the transmissions of the white level (voltage exceeding the threshold) or black level (voltage below the threshold voltage) this angle remains below 30° even at the maximum transmission level.

In the case of a pure nematic liquid crystal, angle $\beta$ is zero for all molecules of the liquid crystal coating and the angle $\alpha_M$ at the centre of the coating is given by the following formula applying in the case of angle $\alpha$ below 30°:

$$\alpha_M{}^2 = (V_a{}^2 - V_{SO}{}^2)(V_a{}^2(\tfrac{2}{3} - E_a/E_{par}) - H_{31} V_{SO}{}^2)^{-1} \quad (2)$$

In this formula, angles $\alpha_M$ is expressed in radians, $V_a$ represents the voltage applied between the electrodes, $V_{SO}$ represents the threshold voltage of the electro optical effect in the pure nematic liquid crystal cell, $E_a$ represents the dielectric anisotropy of the pure nematic liquid crystal, which is assumed to be negative in the present invention and equal to the difference between the value $E_{par}$ of the dielectric constant of a molecule, counted parallel to the axis thereof, and the value $E_{perp}$ of said constant, counted perpendicularly to said axis and $H_{31}$ is equal to $(K_{33} - K_{11})/K_{33}$, $K_{33}$ being the bending elastic constant of said liquid crystal.

In the known nematic liquid crystal displays, for improving the multiplexing level, attempts are made to use nematic liquid crystals having the highest possible ratio $H_{31}$. The known displays use nematic liquid crystals, whose ratio $H_{31}$ is approximately 0.21 and whose threshold voltage $V_{SO}$ is approximately 4.5 V.

The relation giving the angle $\alpha_M$ is modified in the following way, when a chiral solute is added to the nematic liquid crystal:

$$\alpha_M{}^2 = (V_a{}^2 - V_S{}^2)(V_a{}^2(\tfrac{2}{3} - E_a/E_{par}) - H_{31}{}^+ V_S{}^2)^{-1} \quad (3)$$

In the above relation, which only applies in the case of angles $\alpha_M$ below 30° (which is the case in the invention for which $\alpha_M$ is very low and can be approximately 10°), $V_S$ represents the threshold voltage corresponding to the nematic mixture plus the chiral solute and is:

$$V_S = (1-X)^{\frac{1}{2}} V_{SO} \quad (4)$$

with:

$$X = 4(K_{22}/K_{33})^2(e/P_0)^2 \quad (5)$$

In which $K_{22}$ represents the twisting elastic constant of the pure nematic liquid crystal.

Quantity $H_{31}{}^+$ is given by the following formula:

$$H_{31}{}^+ = H_{31} + X(1-X)^{-1}(2H_{32} + H_{31} - \tfrac{2}{3}) \quad (6)$$

in which $H_{32}$ is equal to $(K_{33} - K_{22})/K_{33}$.

It is clear that if the condition $$7K_{33} > 6K_{22} + 3K_{11} \quad (7)$$

is realized, quantity $H_{31}{}^+$ exceeds quantity $H_{31}$. Thus, the nematic liquid crystal doped by the chiral solute has a better selectivity on electric addressing than the pure nematic liquid crystal. Therefore, the multiplexing level is increased by adding a chiral solute to the nematic liquid crystal.

At the same time it can be seen that the threshold voltage $V_S$ is below the threshold voltage $V_{SO}$, which corresponds to a reduction in the addressing voltages.

However, excessive doping leads to a luminous efficiency loss. A good compromise between the luminous efficiency and the multiplexing level is obtained by carrying out doping in such a way that the aforementioned relation 1 is satisfied, which effectively implies a limitation of the doping, because the inverse of $P_O$ is proportional to the ratio of the chiral solute in the mixture formed.

In an indicative and non-limitative manner, the nematic liquid crystal is a mixture of Schiff's bases proving the inequality 7 with an obviously infinite twist $P_O$ (no doping) a coefficient $H_{31}{}^+$ of 0.21, a zero coefficient X and a threshold voltage $V_S$ of 4.5 V. The chiral solute is the product marketed under reference CB15 by MERCK. For various concentrations of this product (corresponding to different twists $P_O$), the following table is obtained:

TABLE I

| $P_0$ | $H_{31}{}^+$ | X | $V_S$ |
|---|---|---|---|
| infinity | 0.21 | 0 | 4.50 V |
| 40 μm | 0.22 | 0.014 | 4.46 V |
| 20 μm | 0.245 | 0.055 | 4.37 V |
| 10 μm | 0.38 | 0.220 | 4 V |

The passage of $H_{31}{}^+$ from a value of 0.21 to a value of 0.38 makes it possible to increase the multiplexing level by approximately 50%.

Thus, the invention makes it possible to obtain moving or fixed image displays which can have 400 or more lines.

It should be noted that the cell according to the invention is not comparable with the aforementioned known cells having dichroic dyes. The cell according to the invention uses an optical effect calling on the birefringence of a liquid crystal without a dye and has at least one light polarizing means. Moreover, the chiral solute ratio is much lower than in the known cells. In addition, the white and black state in the cell according to the invention both correspond to very small tilts of the molecules (about 1° for the black state and 10° for the white state in the centre of the liquid crystal coating). These small tilts permit a great selectivity of the electro optical effect at the voltage applied between the electrodes, the display then being acquired for a signal to noise ratio of close to 1.05.

The aforementioned formulas 2 and 3 are not applicable to cells with dichroic dye for which the tilts under voltage are very significant.

On returning to FIG. 1, the cell described hereinbefore with reference thereto has transparent electrodes and also comprises a first linear polarizer 12 and a second linear polarizer 14 surrounding the system constituted by coating 2 and by the two plates 4 and 6. The first polarizer 12 is on the side of the lower plate 4 and has a maximum absorption direction $P_1$ parallel to axis Oy. The second linear polarizer 14 is on the side of the upper plate 6 and has a maximum absorption direction $P_2$ parallel to axis Ox. The cell is illuminated by light striking the first polarizer 12 and said cell is observed through the second polarizer 14, the observation plane $\pi$ being parallel to plane Oxz.

Figure 2A:
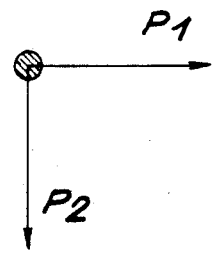
FIGS. 2A and 2B the orientations of the molecules located in the centre of the liquid crystal coating of a pure nematic cell, respectively in the case where no voltage is applied between the cell electrodes and in the case where a voltage exceeding the threshold voltage of said cell is applied between said electrodes.
Figure 2B:
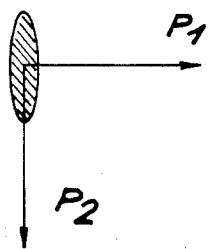
Figure 3:
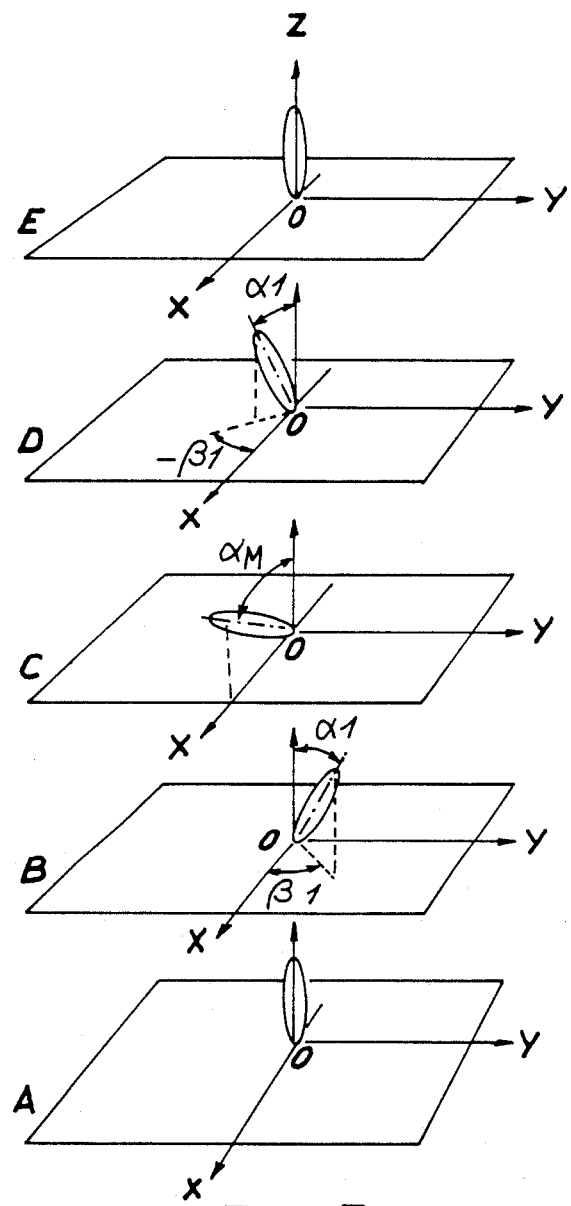
FIGS. 3A to 3E the orientations of the molecules of a liquid crystal coating of a cell according to the invention at different levels of said coating, when a voltage exceeding the threshold voltage of the cell is applied between the electrodes thereof.
Figure 4:
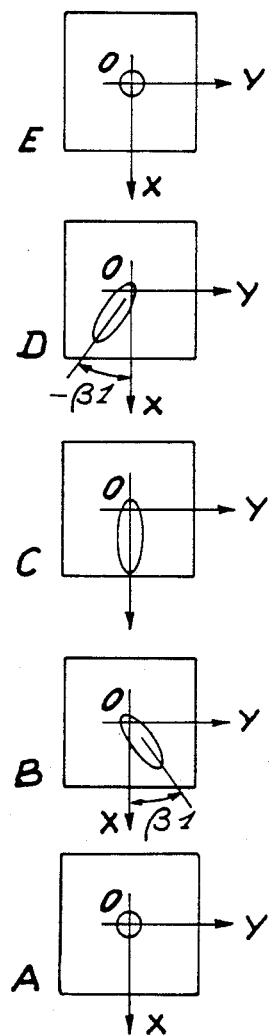
FIGS. 4A to 4E the different orientations in plan view.

For a cell of the same structure, but whose coating is constituted by a pure nematic liquid crystal, the angles $\beta$ of the molecules then being constantly zero, the direction of the majority tilt of the molecules of said coating, corresponding to the application of a voltage between the electrodes exceeding the threshold voltage of the cell, is projected onto plane Oxy in a direction parallel to $P_2$. Thus, there is no birefringency effect, no matter whether the cell is inoperative (FIG. 2A), the molecules all being substantially oriented along axis Oz, or the cell is excited (FIG. 2B), said molecules then being tilted parallel to plane $\pi$.

For a pure nematic liquid crystal cell using the electrically controlled birefringency effect, there is consequently an incompatibility between tilting parallel to the observation plan $\pi$ (which is necessary in order to have a good symmetry of the viewing angle) and the arrangement of the linear polarizers opening the viewing angle in observation plane $\pi$. Thus, use is generally made of circular polarizers for obviating the aforementioned incompatibility.

According to the invention, the addition of the chiral solute to the nematic makes it possible to turn the tilt direction n in the thickness of the liquid crystal coating. This is shown in perspective in FIGS. 3A–3E and in plan view in FIGS. 4A–4E, which are respectively the homologs of FIGS. 3A–3E, the latter respectively corresponding to decreasing depths $Z=0$, $Z=\Delta Z$, $Z=e/2$, $Z=e-\Delta Z$ and $Z=e$, counted on axis Oz. The values of $\alpha$ and $\beta$ corresponding to these depths are given in the following table in which $\beta_1$ is a positive value:

TABLE II

| z | 0 | $\Delta z$ | e/2 | $e - \Delta z$ | e |
|---|---|---|---|---|---|
| $\alpha$ | 0 | $\alpha_1$ | $\alpha_M$ | $\alpha_1$ | 0 |
| $\beta$ | — | $\beta_1$ | 0 | $-\beta_1$ | — |

The angle $\alpha$ passes through its maximum $\alpha_M$ for $Z=e/2$.

Doping leading to a twist $P_0$ satisfying the double inequality 1 makes it possible to avoid "waveguide" conditions (used for cells of the helical nematic type but which are prejudicial for cells of the electrically controlled birefringence type), due to the small tilt angles obtained according to the invention, and to give an optical sensitivity to the tilt, even between 2 linear polarizers arranged as indicated hereinbefore with reference to FIG. 1 and leading to a wide viewing angle in observation plane $\pi$.

It would not pass outside the scope of the invention to eliminate polarizer 12 and replace transparent electrode 8 by an optically reflecting electrode, the cell then being illuminated by light striking the second polarizer 14.

What is claimed is:

1. An electrically controlled birefringence effect liquid crystal cell comprising a system having a liquid crystal layer, two parallel transparent plates on either side of the layer, a transparent electrode on each plate, and two crossed linear polarizers on either side of the system, wherein the liquid crystal is a nematic liquid crystal having a negative dielectric anisotropy and is weakly doped by a chiral solute in such a way that the resulting cholesteric liquid crystal twist exceeds approximately twice the thickness of the layer and is less than approximately 8 times said thickness and the liquid crystal molecules are substantially perpendicular to the plates in the absence of voltage between the electrodes and wherein one of the polarizers is arranged in such a way that its maximum absorption direction is substantially parallel to the projection on it of the alignment direction taken by the liquid crystal molecules located at the center of the layer in the presence of a voltage between the electrodes exceeding the threshold voltage of the cell.

2. An electrically controlled birefringence effect liquid crystal cell comprising a system having a liquid crystal layer, two parallel transparent plates on either side of the layer, a transparent electrode on one plate, an optically reflecting electrode on the other plate and a linear polarizer on the side of the system with the transparent electrode, wherein the liquid crystal is a nematic liquid crystal having a negative dielectric anisotropy and is weakly doped by a chiral solute in such a way that the resulting cholesteric liquid crystal twist exceeds approximately twice the thickness of the layer and is less than approximately 8 times said thickness and the liquid crystal molecules are substantially perpendicular to the plates in the absence of voltage between the electrodes and wherein the polarizer is arranged in such a way that its maximum absorption direction is substantially parallel to the projection on it of the alignment direction taken by the liquid crystal molecules located at the center of the layer in the presence of a voltage between the electrode exceeding the threshold voltage of the cell.

3. A cell according to claim 1 or 2, wherein the nematic liquid crystal is chosen in such a way that its fanning $K_{11}$, twist $K_{22}$ and bending $K_{33}$ elastic constants prove the following relation:

$$7K_{33} > 6K_{22} + 3K_{11}.$$

* * * * *

UNITED STATES PATENT AND TRADEMARK OFFICE
CERTIFICATE OF CORRECTION

PATENT NO. : 4,786,147

DATED : November 22, 1988

INVENTOR(S) : Jean-Frederic Clere and Laurence Rabas

It is certified that error appears in the above-identified patent and that said Letters Patent is hereby corrected as shown below:

Title page:

Under U.S. References Cited, Document #3,814,501, delete "Schlindcer" insert --Schlindler--.

Column 1, line 61, after "former." Insert:

-- According to a special embodiment of the invention, the two electrodes--.

Column 1, line 61, delete "rodes".

Column 4, line 10, delete "2/3" insert --2/3)--.

Column 4, line 63, delete "state" insert --states--.

Column 5, line 34, delete "plan" insert --plane--.

Column 6, line 52, delete "electrode" insert --electrodes--.

Signed and Sealed this

Fourth Day of April, 1989

*Attest:*

DONALD J. QUIGG

*Attesting Officer*

*Commissioner of Patents and Trademarks*